(12) United States Patent
Tobin

(10) Patent No.: US 11,146,532 B2
(45) Date of Patent: Oct. 12, 2021

(54) INFORMATION SECURITY USING BLOCKCHAIN TECHNOLOGY

(71) Applicant: Kevin Tobin, Avon, CT (US)

(72) Inventor: Kevin Tobin, Avon, CT (US)

(*) Notice: Subject to any disclaimer, the term of this patent is extended or adjusted under 35 U.S.C. 154(b) by 280 days.

(21) Appl. No.: 16/200,633

(22) Filed: Nov. 26, 2018

(65) Prior Publication Data

US 2019/0166095 A1 May 30, 2019

Related U.S. Application Data

(60) Provisional application No. 62/591,181, filed on Nov. 27, 2017.

(51) Int. Cl.
*H04L 29/06* (2006.01)

(52) U.S. Cl.
CPC ...... *H04L 63/0209* (2013.01); *H04L 63/1483* (2013.01); *H04L 63/0428* (2013.01); *H04L 2209/38* (2013.01)

(58) Field of Classification Search
CPC ............ H04L 63/0209; H04L 63/1483; H04L 2209/38; H04L 63/0428; H04L 9/3239; H04L 29/06
See application file for complete search history.

(56) References Cited

U.S. PATENT DOCUMENTS

| | | | |
|---|---|---|---|
| 8,990,944 B1* | 3/2015 | Singh | G06F 21/53 726/24 |
| 9,635,000 B1 | 4/2017 | Muftic | |
| 9,774,578 B1 | 9/2017 | Ateniese et al. | |
| 10,091,228 B2 | 10/2018 | Li et al. | |
| 10,135,607 B1* | 11/2018 | Roets | H04L 9/3213 |
| 2007/0239961 A1* | 10/2007 | Noguchi | G11B 20/00086 711/216 |
| 2012/0216259 A1* | 8/2012 | Okamoto | H04L 12/4641 726/4 |
| 2016/0275461 A1 | 9/2016 | Sprague et al. | |
| 2017/0331896 A1 | 11/2017 | Holloway et al. | |
| 2019/0141024 A1* | 5/2019 | Wang | H04L 63/08 |
| 2019/0296915 A1* | 9/2019 | Lancashire | G06Q 20/3825 |

(Continued)

OTHER PUBLICATIONS

Zibin Zheng et al., An Overview of Blockchain Technology: Architecture, Consensus, and Future Trends, Conference Paper, Jun. 2017, 2017 IEEE 6th International Congress on Big Data.

(Continued)

*Primary Examiner* — Quazi Farooqui
(74) *Attorney, Agent, or Firm* — Bakos & Kritzer

(57) ABSTRACT

Blockchain technology is used to provide security of electronic systems. The disclosed technology allows for a dynamic bond of trust to be applied to the field of information security without the need for a single point of trust to first be established. The lines of trust between electronic systems or devices is established by distributing information among the systems or devices. This allows for easy identification of commonalities and/or decision making whereby policy(s)/action(s)/monitoring/etc. can be enforced when those commonalities align. Simultaneously, deviations from those commonalities can be identified and policy(s)/action(s)/monitoring/etc. may also be invoked.

20 Claims, 8 Drawing Sheets

(56) References Cited

U.S. PATENT DOCUMENTS

2019/0349426 A1* 11/2019 Smith .................. H04L 67/104

OTHER PUBLICATIONS

Aaron Wright & Primavera De Filippi, Decentralized Blockchain Technology and the Rise of Cryptographia, Journal Paper, Mar. 20, 2015, Social Science Research Network, Available at SSRN: https://ssrn.com/abstract=2580664 or http://dx.doi.org/10.2139/ssm.2580664.

* cited by examiner

INFORMATION SECURITY USING BLOCKCHAIN TECHNOLOGY

CROSS-REFERENCE TO RELATED APPLICATION

This application claims the benefit of U.S. Patent App. No. 62/591,181, filed Nov. 27, 2017, and the foregoing application is incorporated by reference herein in its entirety.

BACKGROUND

Blockchain technology has served as the basis of many new technologies, such as the rise of crypto-currencies. Blockchains take different forms, and may comprise a distributed, public or centralized ledger that acts as a single source of truth for information. With cyber attackers frequently targeting sensitive information, there is a need for a way to protect sensitive information from cyber attacks, such as Man in the Middle ("MITM") attacks. Further, there has been a problem in the dissemination of a trusted key, password, passphrase, certificate, PIN, etc., to one party, which creates a security vulnerability that risks compromising the entire collection of sensitive information. Therefore, there is a need for a technology that can protect sensitive information from cyber attacks, such as MITM attacks, and security risks arising from the potential disclosure of a single trusted key, password, passphrase, certificate, PIN, etc.

The elements of blockchain technology are known in the art. See, for example, "An Overview of Blockchain Technology, Architecture, Consensus, and Future Trends" by Zibin Zheng, et al., IEEE Int'l Congress on Big Data Conference Paper, June 2017 (accessed at https://www.researchgate.net/publication/318131748 An_Overview_of_Blockchain_Technology_Architecture_Consensus_and_Future_Trends), and "Decentralized Blockchain Technology and the Rise of Lex Cryptographia" by Aaron Wright and Primavera de Filippi, Social Science Research Network Paper, Mar. 10, 2015 (accessed at https://papers.ssrn.com/sol3/papers.cfm?abstract_id=2580664), which explain the basics of this technology and are herein incorporated by reference.

SUMMARY

By leveraging certain configurations, properties and/or attributes of similar electronic devices to generate a baseline of normalcy, a shared fingerprint of a known good configuration emerges. Deviations from the norm, as determined through the outliers from the majority, can be flagged as potentially malicious. The selection of properties and/or number of attributes to monitor may impact the predetermined severity of a suspected compromise.

BRIEF DESCRIPTION OF THE DRAWINGS

The detailed description makes reference to the accompanying figures wherein.

Figure 1:
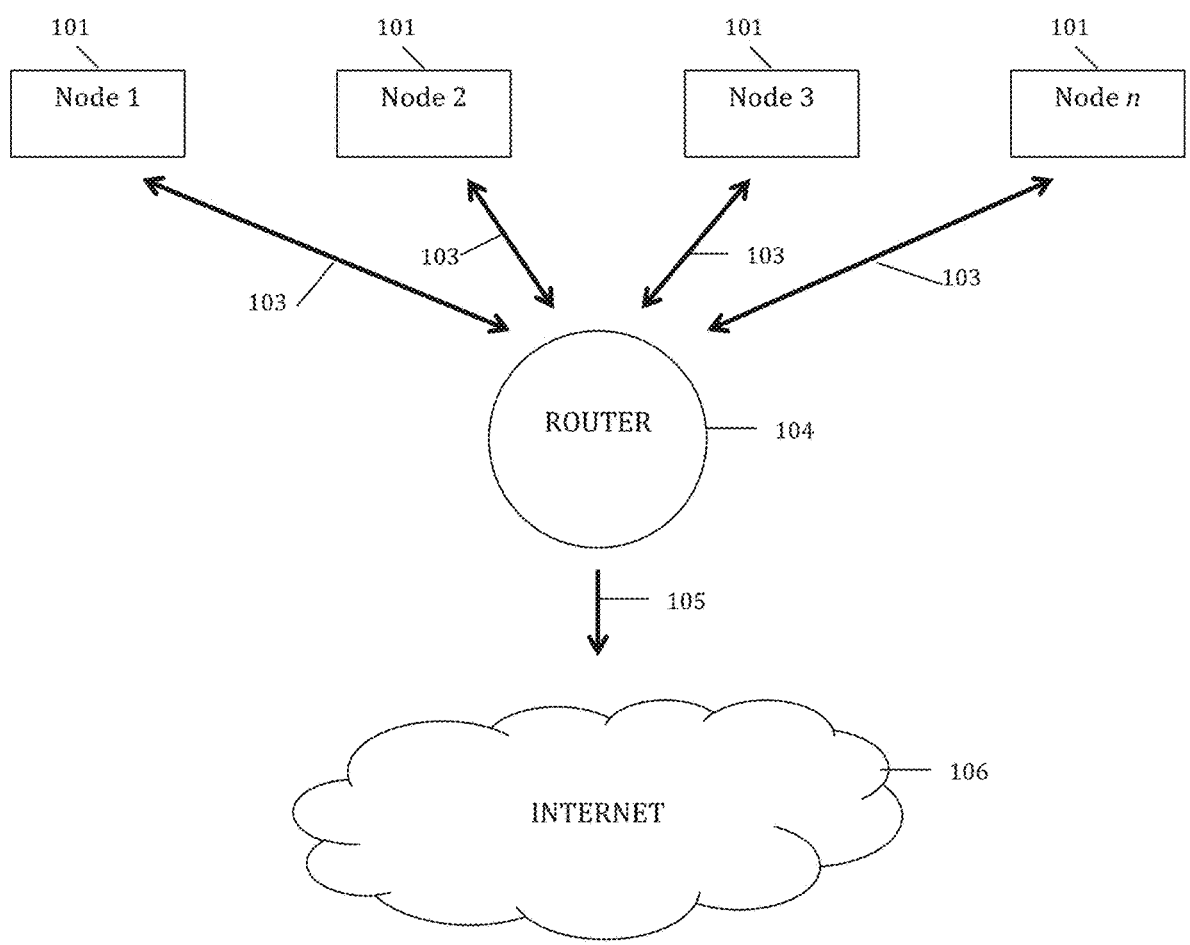
FIG. 1 illustrates a diagram of the informational security system in accordance with the principles disclosed herein.

The figures are intended to facilitate the description of the principles disclosed herein. The figures do not illustrate every aspect of the principles disclosed herein and do not limit the scope of the principles disclosed herein. Other objects, features, and characteristics will become more apparent upon consideration of the following detailed description.

DETAILED DESCRIPTION

A detailed illustration is disclosed herein. However, techniques, methods, processes, systems and operating structures in accordance with the principles disclosed herein may be embodied in a wide variety of forms and modes, some of which may be quite different from those disclosed herein. Consequently, the specific structural and functional details disclosed herein are merely representative.

None of the terms used herein, including "a," "an," "the," and "their," are meant to limit the application of the principles disclosed herein. The use of "or" is intended to include "and/or," unless the context clearly indicates otherwise. The terms are used to illustrate the principles disclosed herein and are not intended to be limiting. References to encryption should be understood to include encryption at rest and/or in transit as applicable. Further, references to a single network or a single device (e.g., router) should not be viewed as limiting, as the description herein is intended to facilitate understanding. The principles disclosed herein may be applied to multiple interconnected networks, and additional information used in the system may include, without limitation, other attributes such as a trace-route of hops, and hardware and/or software information.

Disclosed herein is a system and method of invoking informational security through the use of blockchain technology. By leveraging the known information of the masses at any given point in time, a baseline of trust can be inferred. Alterations from this baseline can be used to identify potentially malicious actor(s) that have interfered with this trust. At the same time, the reverse can also be achieved, whereby an object (such as a key, password/passphrase, PIN, code, certificate, biometric marker, authentication token, etc.) that is trusted, can be disseminated among various parties where no one user maintains control of the trusted object. Only during times when all factions of the dissemination are complete can the trusted object be invoked.

In one example, the system and method of invoking informational security can secure monitored properties and mitigate MITM attacks. The implementation can be such that the information communicated by a network device or the client or host system tracks its current communications device, such as for example a default gateway. For illustrative purposes, a default gateway is referenced in the description below.

The default gateway is normally a prime target of an attacker to gain MITM positioning. The attacker will spoof the attacker's network information (such as an IP/MAC address, but other network information is contemplated as well) to the default gateway (commonly a router, but other default gateways are contemplated as well) and claim to be that of its intended victim. Simultaneously, the attacker will target the victim and spoof similar network information and claim to be the default gateway. This forces the victim's traffic to the attacker before reaching the true default gateway, where the attacker offloads the victim's original traffic in order to complete the connection and leaving the victim completely unaware of the interception.

In the event where an organization is concerned about insider threats or MITM attacks, each computer or electronic device, including but not limited to a cell phone, automobile, router, or internet connected device, etc. (herein referred to as "node"), can contain software that periodically tracks the IP/MAC address of the default gateway. This information is collected, optionally encrypted at-rest and/or in transit, and shared amongst other nodes. All nodes within the same network segment in a secured environment would share similar properties regarding the default gateway. The periodic checking can then be configured to take evasive action (such as quarantining that node to restrict access to certain or all resources), invoke logging, commence simple monitoring, and/or no action at all. While encryption is optional, encrypting the collected information increases the security of the information and is preferably utilized.

The information can be stored across each node (known as a decentralized model) or on a separate device (known as a centralized model) where all nodes report this information.

When a network device such as a router (gateway), switch, access point, etc. is replaced, since all devices on the network would witness the change at the same time, all devices would maintain an agreement and thus transfer that trust to the new device. There is no need to reconfigure the baseline of trust as it occurs dynamically. This concept of monitored properties can apply to nearly any attribute of a node. Monitoring various attributes of nodes and comparing them among others, such as registry keys, software, various configurations, etc., can enhance anti-virus capabilities.

Security measures may be taken in response to the network detecting an information breach. These security measures include, but are not limited to, quarantining the compromised node, restricting the compromised node's access to certain or all resources in the system, monitoring and collecting information about the attacker from the compromised node, or retaining all forensic information about the attacker, including MAC address, IP address, and date and time of the attack. If so desired, the system can be configured to allow no action to be taken as well. Other security measures may be implemented as well.

In general, a larger number of nodes in the system provides for a more secure system. However, performance of the system is impacted by a large number of nodes, and the performance of such a system may become too slow for practical use. Pruning the blockchain prevents it from going beyond this critical point and becoming too large. Specifically, the oldest elements are permitted to fall off so long as a pre-determined threshold of data is sufficiently and accurately synchronized across the nodes. It may be determined that if all nodes agree on the stored data (for example, from 7 years ago), then this data no longer needs to be retained. The pruning process can begin to truncate the oldest elements, allowing the chain of nodes to pick up at an agreeable point in time, until the next truncation takes place, which can be automatic or scheduled. Pruning can be used to optimize the size of data, performance, user experience, specific dates and events, etc. Pruning can become important because network connectivity is dynamic and requires speed. Attempting to validate a plurality of nodes without this mechanism may impact usability of the system. The frequency of scheduled pruning or the identification of trigger events to begin pruning can be configured based upon what the implementer of the system prioritizes, such as security or performance. For example, less frequent pruning may be sought by users seeking more security, while more frequent pruning may be sought by users seeking performance. Pruning can be based on time, size of data, speed of performance, or upon a specific event or date, and other ways of invoking pruning may be implemented as well.

Pruning comes with its own limitations. An attacker that is able to trick the components into accelerating the hardware or software clock time can create an environment where data gets purged more frequently than expected. Additionally, if data size is the primary indicator to signal a purge, then an attacker may attempt to accelerate the amount of data that gets ingested which could force pruning to occur more frequently than expected. The hardware/software clock is critical to the integrity of the system, so if the clock is able to be attacked, this may lead to the inability to trust data. Thus, integrity checks are important to the operation of the system.

Another example allows for the customization of data to be collected as well as when and/or where that data is collected. For example, if user takes a work device home, it could be configured to optionally not update the blockchain, but merely provide a warning to the user that they are currently "off-network" and/or not contributing to the blockchain, and their usage of the laptop/cell phone/device/etc. may be restricted to certain pre-approved activities, resources, etc. In a decentralized model, the blockchain may still be updated, but may observe a more permissive threshold before flagging another device.

In another example, the system and method of invoking informational security can minimize the risk of compromising sensitive data from a single point of power. There are many instances where a single user is trusted with a high privileged master key that empowers the user to have such high-level access that it could pose a threat to the organization if control of that master key is ever lost, stolen, sold, traded, or used maliciously (or even mistakenly) by that single user. The principles disclosed herein offer a way to protect that high level access without requiring the trust of any single one individual.

To achieve this, the master key is instead disseminated among various entities or nodes, and optionally encrypted. Like pieces of a puzzle, the master key can only be reassembled via the blockchain. Once all users with a piece of that key declare its use (and within a certain timeframe), the key can be invoked with all of its intended privileges. Only when all users with pieces of the key declare their use can the sensitive data be reached. If only a portion of the users with pieces of the key declare their use, the sensitive information will remain locked and secured. Therefore, the only way of reaching the sensitive data is by assembling all pieces of the key through the blockchain, thereby creating one master key to access the sensitive data.

This is not limited to authentication, but can also be applied to specific activity types, if so desired. One other example might be the restriction of any activity that would involve a deletion or change of access unless all parties holding a partial key come to a consensus. Other applications of this technology are also considered.

The flowcharts and general diagrams illustrate the architecture, functionality, and operation of possible implementations of the principles disclosed herein. In this regard, each block in the flowcharts or general diagrams may represent a segment or portion of instructions, which include one or more executable instructions for implementing the specified functions. In some alternative implementations, the functions noted in the diagrams or flowcharts may occur out of the order noted in the figures. For example, two blocks in a flowchart shown in succession may, in fact, be executed substantially concurrently.

Referring to FIG. 1, a general diagram of the system for invoking informational security utilizing blockchain is shown. In this example, nodes 1, 2, 3 . . . n 101 share information between each other via router 104. Each node 101 individually communicates information to the router 104, depicted by router connections 103. The router 104 then communicates with the Internet 106 through a separate connection 105. This general scheme allows each nodes 1-n 101 to share information with each other. The information is shared via a communication network, which may be made up by a wired/wireless network/wireless transmission(s)/NFC/Bluetooth/etc. and/or the separate connection 105, which may, for example, be Internet protocols. Each individual router connection 103 allows the information to travel from node 1 101 to/from the router 104, node 2 101 to/from the router 104, node 3 101 to/from the router 104, and so on to node n 101 to/from the router 104. As long as the information traveling along each of these router connections 103 is (preferably signed with each node's private key) identical, then the system can be considered secure and authentic. If the information traveling via each router connection 103 is not identical, then the system knows there has been a security breach, and can isolate and/or notify the node 101 giving the incorrect information that it has been compromised.

It should be understood that peer to peer communications between nodes may be implemented. In such a configuration, a MITM security attack may target the communications between two or more nodes. In such a configuration, the principles disclosed herein may be applied to detect such a MITM security attack, allowing the system to isolate and/or notify the affected node(s).

Figure 2:
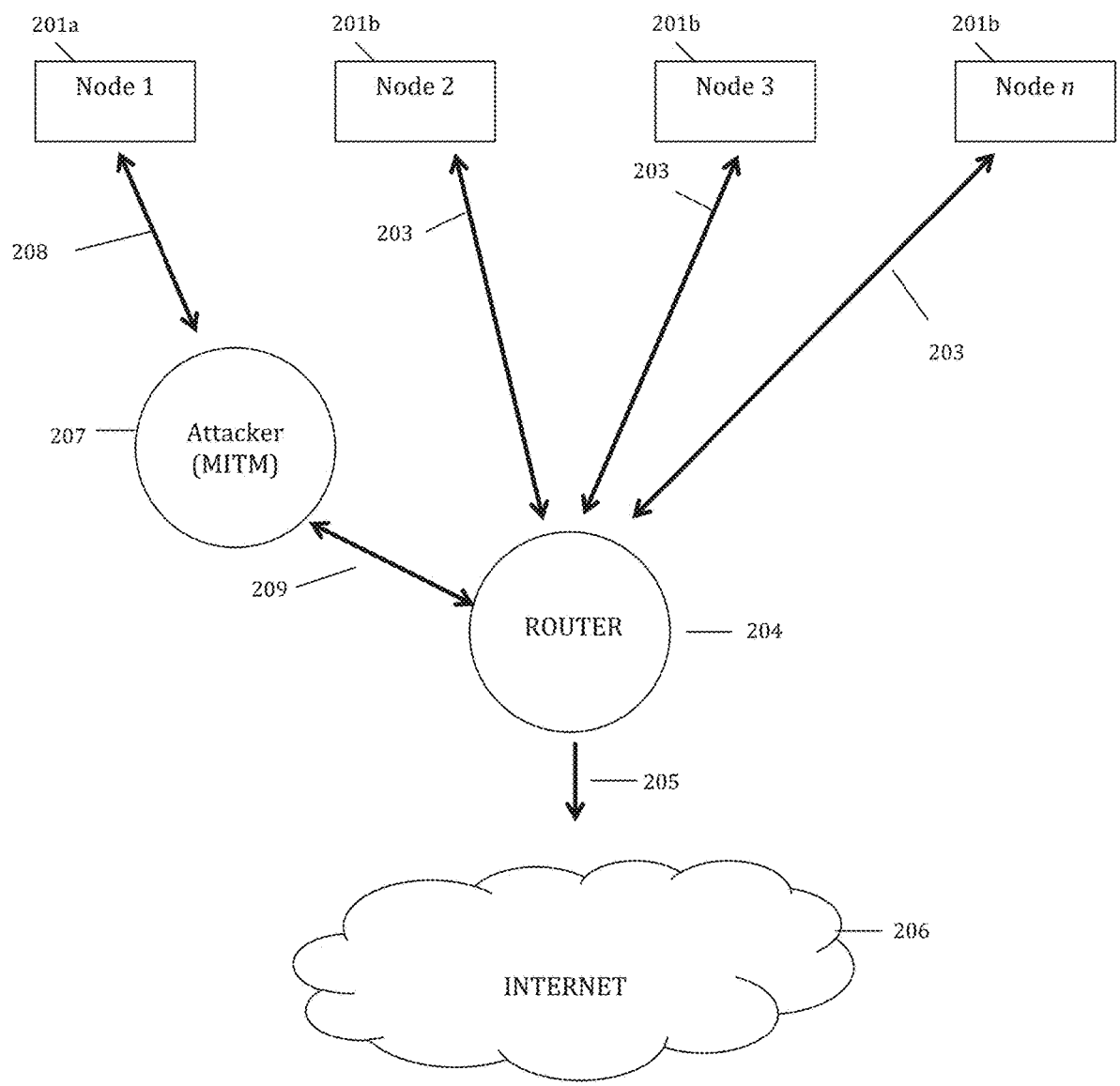
FIG. 2 illustrates a diagram of the informational security system when attacked in accordance with the principles disclosed herein.

FIG. 2 shows a diagram of an exemplary MITM security attack. In this example, each node 201b communicates with each other via router 204. As in FIG. 1, the router 204 sends information to the Internet 206 through a separate connection 205. However, a MITM attacker 207 is attempting to become the middle communication point between node 1 201a and the router 204. The attacker 207 does so by mimicking the connection that would have otherwise existed between node 1 201a and router 204. The attacker 207 intercepts the secured information from node 1 201a that is now moving along the connection 208. The attacker 207 then transfers the data along the separate connection 209 to the router 204, leaving little to no trace of the attack. This fools node 1 201a into thinking it is communicating with router 204 when it is really communicating with the attacker 207.

However, applying the principles disclosed herein, node 1 201a is still communicating with nodes 2-n 201b via attacker 207 and router 204, and nodes 2-n 201b are still communicating with each other via their connections 203 to router 204. When an attack, such as this MITM attack, occurs, the information regarding the router 204 that node 1 201a is communicating to nodes 2-n 201b differs from the information regarding the router 204 that nodes 2-n 201b are communicating. This discrepancy allows the chain of nodes to identify the compromised node 1 201a, quarantine node 1 201a due to the breach, and/or initiate other actions to notify node 1 201a that it has been compromised and to prevent or discontinue communications along the connection 208. This action prevents the secured information that node 1 201a would have sent to attacker 207 from ever traveling along connection 208, therefore securing the system.

As described above with reference to FIG. 1, it should be understood that peer to peer communications between the nodes may be implemented. In such a configuration, the principles disclosed herein may be applied to detect such a MITM security attack, allowing the system to isolate and/or notify the affected node(s).

Figure 3:
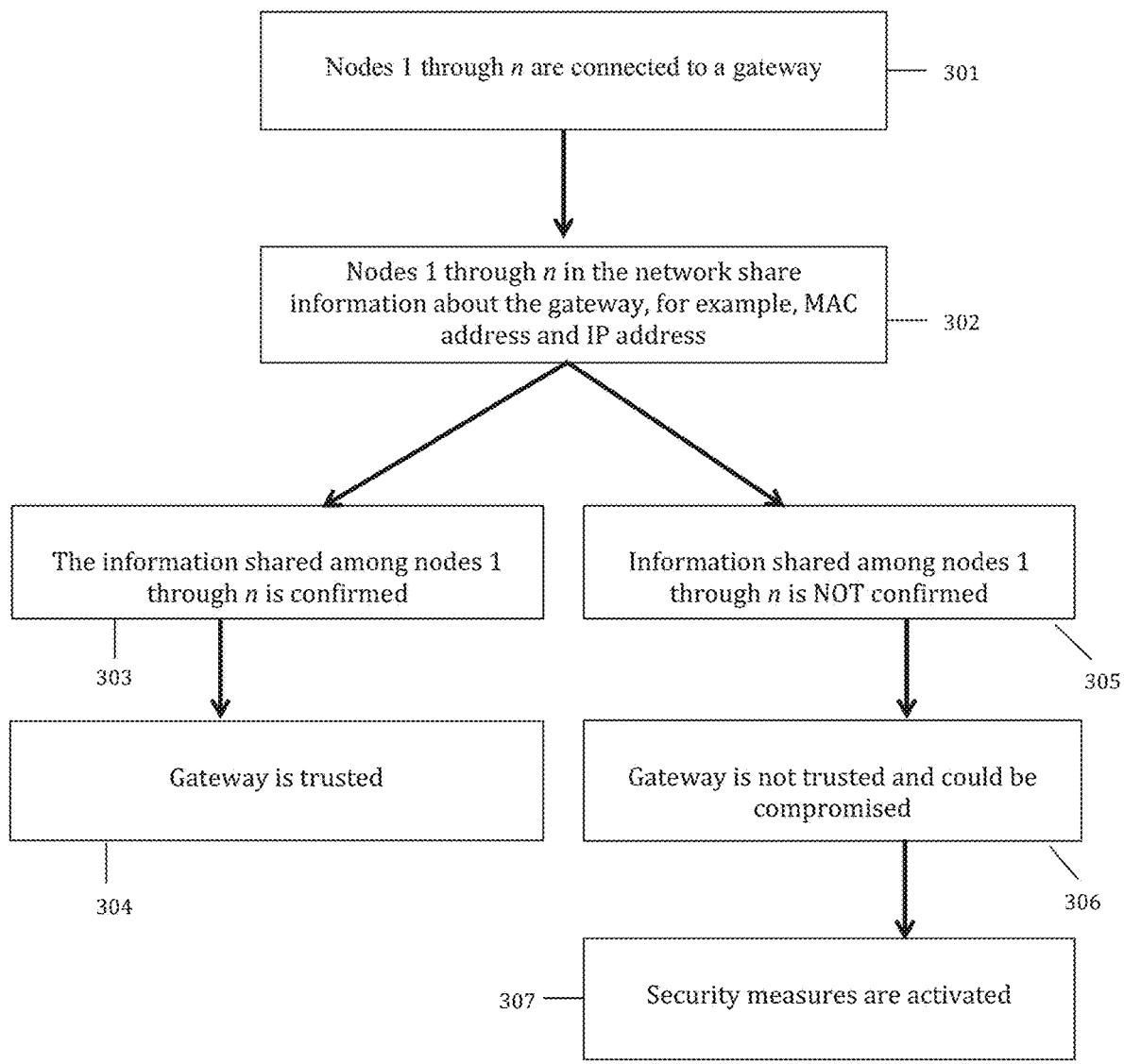
FIG. 3 illustrates a flow diagram of the informational security method in accordance with the principles disclosed herein.

Referring to FIG. 3, a flow chart of the method for invoking informational security is illustrated. In step 301, all nodes 1 through n are connected into a single network. Each of these nodes in the network have the ability to communicate with each other. In step 302, the network is connected to a default gateway, commonly a router. Now each of the nodes can communicate with the default gateway. Nodes 1 through n in the network share information about the default gateway with each other. In this step 302, all nodes will share information about the default gateway (for example MAC address, IPv4 address, Subnet Mask, Internet address, etc., but other information about the default gateway is contemplated) with all of the nodes in the network, thereby creating a record of information about the default gateway. If the record of information is identical, as in step 303, then the gateway is trusted as in step 304, and the nodes communicate with the gateway. If the record of information is not all identical, as in step 305, then the default gateway is not trusted and could be compromised, as shown in step 306. If this situation occurs, the next step 307 is to stop communications from the affected node(s) to the unauthenticated gateway and activate any predetermined security measures, such as isolating the node(s) sending the dissimilar information.

Figure 4:
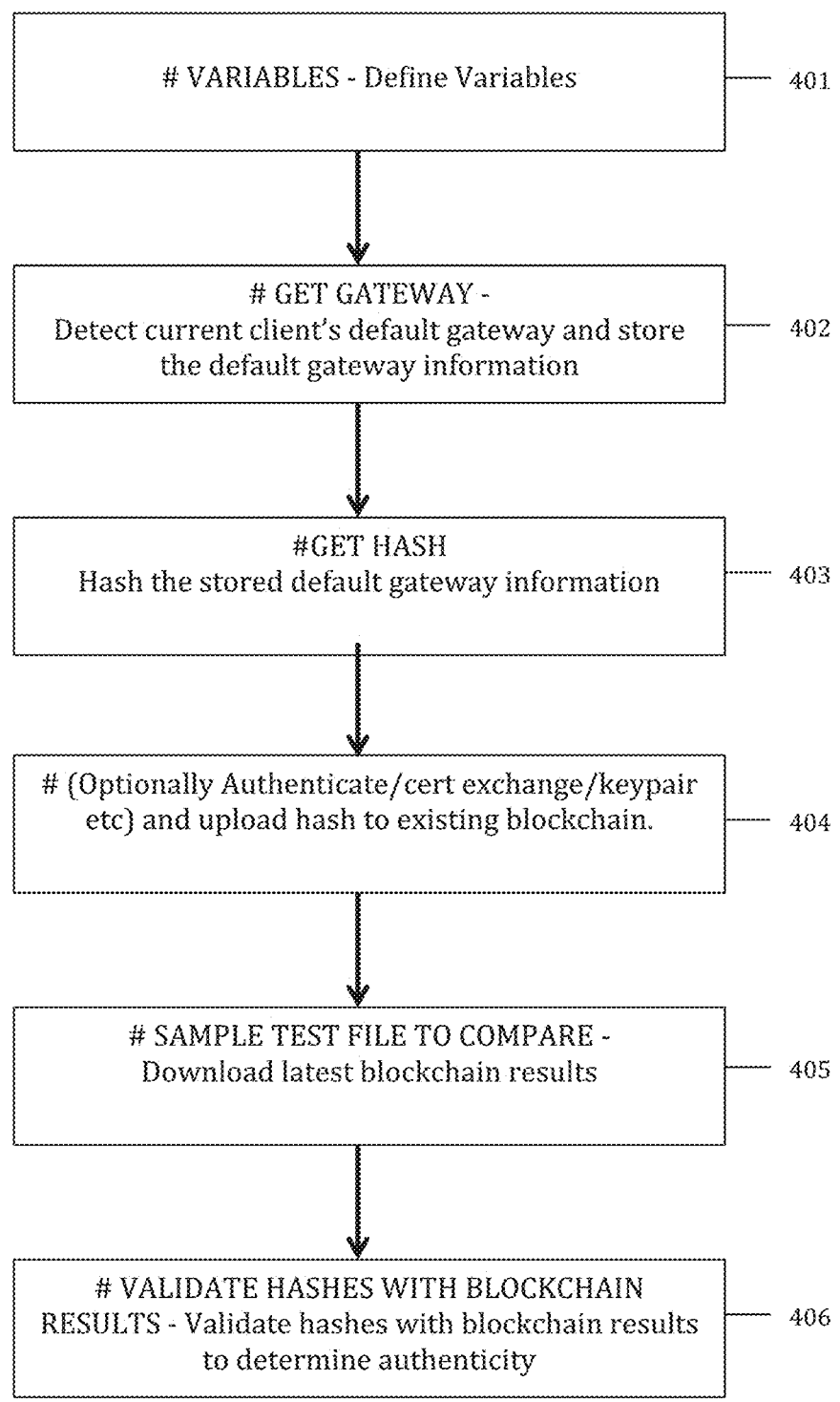
FIG. 4 illustrates a flow diagram of the pseudo-code for the informational security method in accordance with the principles disclosed herein.

Referring to FIG. 4, a flow chart of the pseudo-code for the method for invoking informational security is illustrated. Beginning with step 1 401, the system defines a set of variables. This may include defining or creating a file to store information or setting up a hash, but other variables may be used as well. Next, in step 2 402, the system detects the current client's default gateway information and stores the information. Then, in step 3 403, the system hashes the stored default gateway information. This allows the system to create an easily identifiable record of information that can be used for comparisons in later steps. The hash may be optionally encrypted for higher security. Encrypting the hash prevents any attacker from attempting to lie to other nodes about what hashes exist in the system, further adding to the security of the system. Next, in step 4 404, the system uploads the hash to the existing blockchain, and may optionally authenticate or keypair at this time. This creates the baseline of trust between the nodes of the blockchain. Then, in step 5 405, the system downloads the latest blockchain results at some predetermined later point in time. Lastly, in step 6 406, the blockchain results and hashes are compared to each other, and if they are identical, then the hashes are validated and the connection is authentic and secure. If they are not identical, then the hashes are not validated, and the connection is not secure, at which point security measures may be taken.

Figure 5:
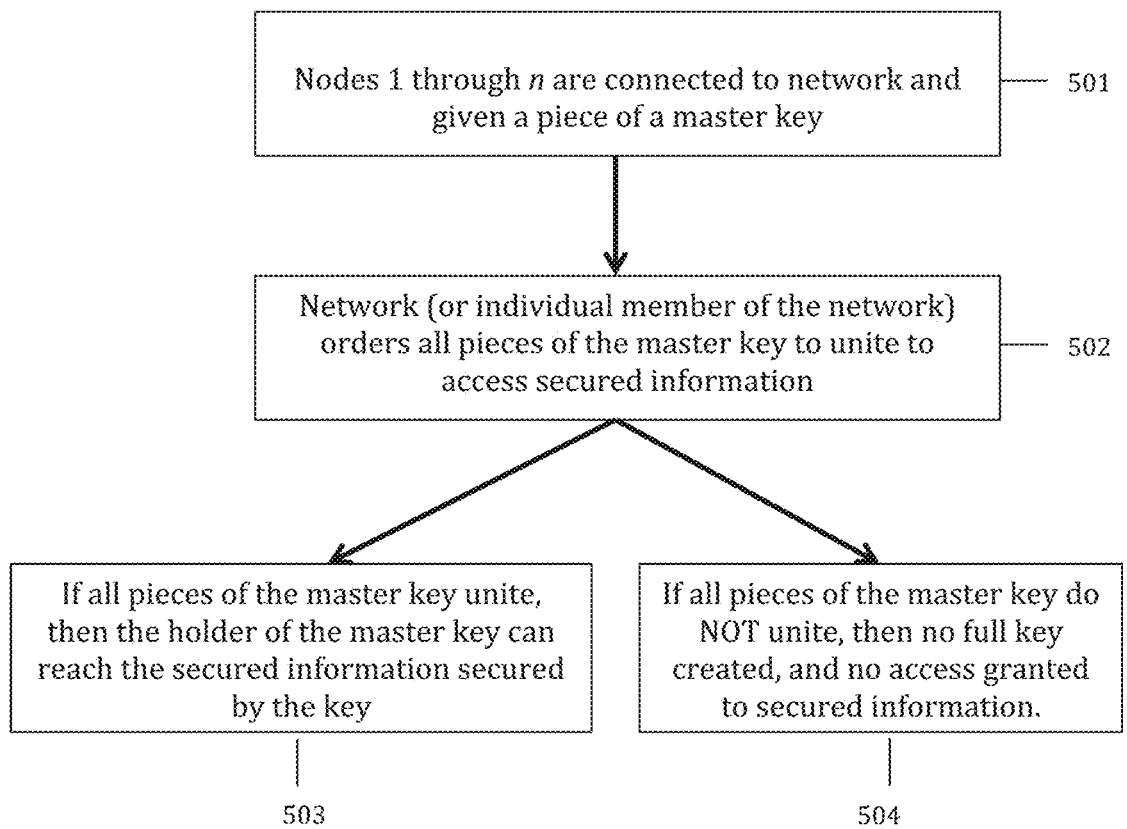
FIG. 5 illustrates a flow diagram of the master key security method in accordance with the principles disclosed herein.

Referring to FIG. 5, a flow chart of the master key example is illustrated. In this example, the first step 501 has the system connect Nodes 1 through n to a network. Each node in the network then receives a predetermined portion of a master key. The master key cannot be used unless all of the portions are brought together, like a puzzle, to form the full master key. Next, in step 2 502, the network, or an individual member of the network, will command all the pieces of the master key to come together in order for the network or individual to access a piece of secured information. Once this command occurs, the pieces will either unite and the system will proceed to step 3a 503, or not unite and the system will proceed to step 3b 504. If all pieces of the master key unite, as in step 3a 503, then the network or individual who made the command will have a complete master key, therefore allowing the network or individual to access the secured information sought. If all pieces of the master key do not unite, as in step 3b 504, then the full master key is not created, and no access will be granted to the network or individual who sought the command. Therefore, this system and method protects any secured information from being compromised by the misuse of a single master key by one single individual, thereby reducing the risk of compromising the secured information.

Figure 6A:
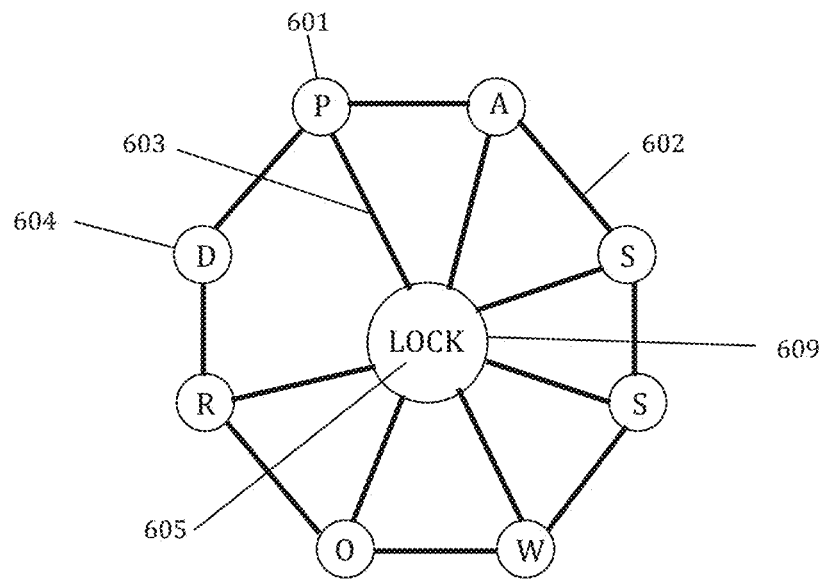
FIG. 6A illustrates a diagram of the master key security method in a locked configuration in accordance with the principles disclosed herein.
Figure 6B:
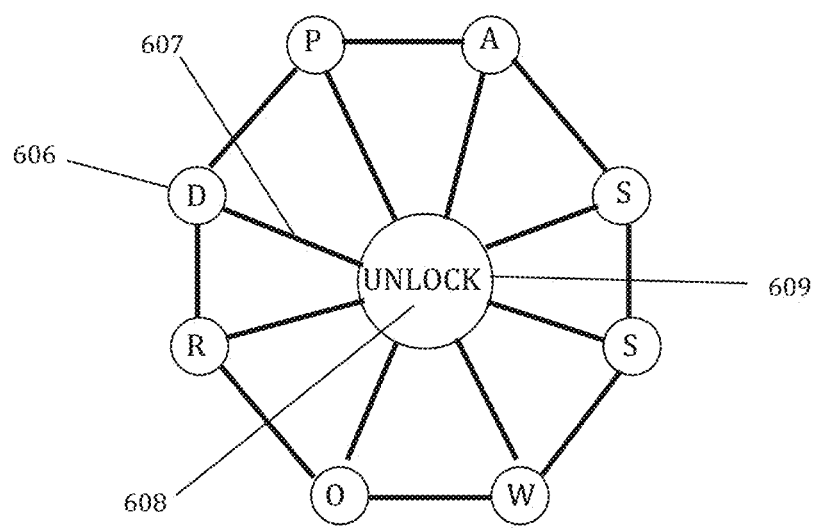
FIG. 6B illustrates a diagram of the master key security method in an unlocked configuration in accordance with the principles disclosed herein.

Referring to FIGS. 6A & 6B, a diagram of the master key example in a locked and unlocked configuration is illustrated. In this example, nodes 601 are all structured to contain a portion of the key to access stored secured information 609. In this example, the portions of the key are represented by the individual letters of "PASSWORD." All of the nodes 601 communicate with each other through communication channels 602. Each node 601 also communicates with the stored secured information 609 through communication channels 603. The communication channels 603 allow each node 601 to report their individual piece of the master key to the stored secured information 609. FIG. 6A illustrates when the stored secured information 609 is in a locked configuration 605. In this example, the nodes 601 containing the master key pieces "PASSWOR" are all reporting the stored secured information 609. However, the node 604 containing the last piece of the master key, "D" here, is not reporting to the stored secured information 609. This places the stored secured information 609 in a locked configuration 605 because not all pieces of the master key have come together to form "PASSWORD" and allow access. FIG. 6B illustrates when the stored secured information 609 is in an unlocked configuration 608. In this example, all nodes containing the master key pieces "PASSWORD" are all reporting the stored secured information 609. Here, node 606 containing "D" and the rest of the nodes 601 are reporting to the stored secured information 609 through a communication channel 607. This assembles the complete master key, here "PASSWORD," and places the stored secured information 609 in an unlocked configuration 608. Increased security can be achieved through this model by increasing the number of nodes 601 who contain pieces of the master key. The larger number of nodes 601, the more secure the stored secured information 609. This example is not intended to be limiting, and the "PASSWORD" master key example is purely illustrative. The number of nodes 601 may be greater or less than illustrated in this example.

Figure 7A:
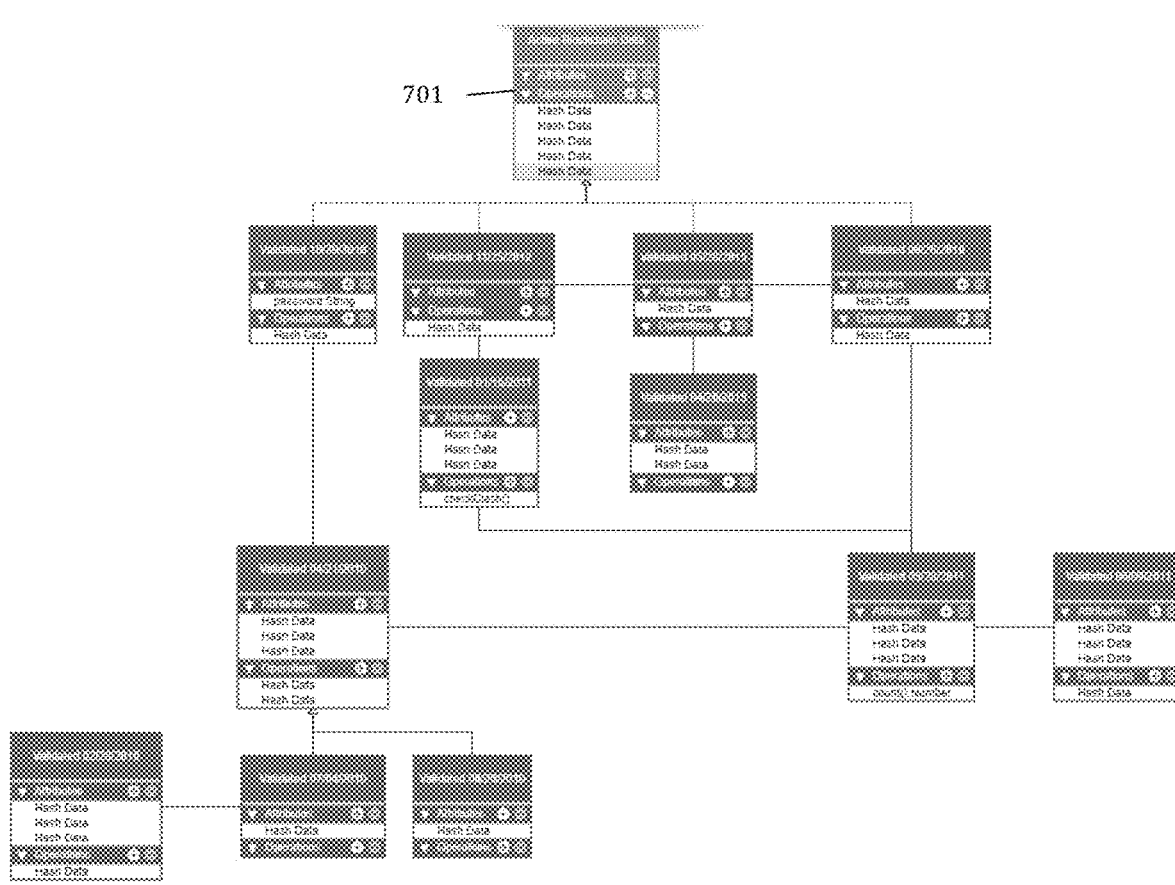
FIG. 7A illustrates an example format of the blockchain before pruning.
Figure 7B:
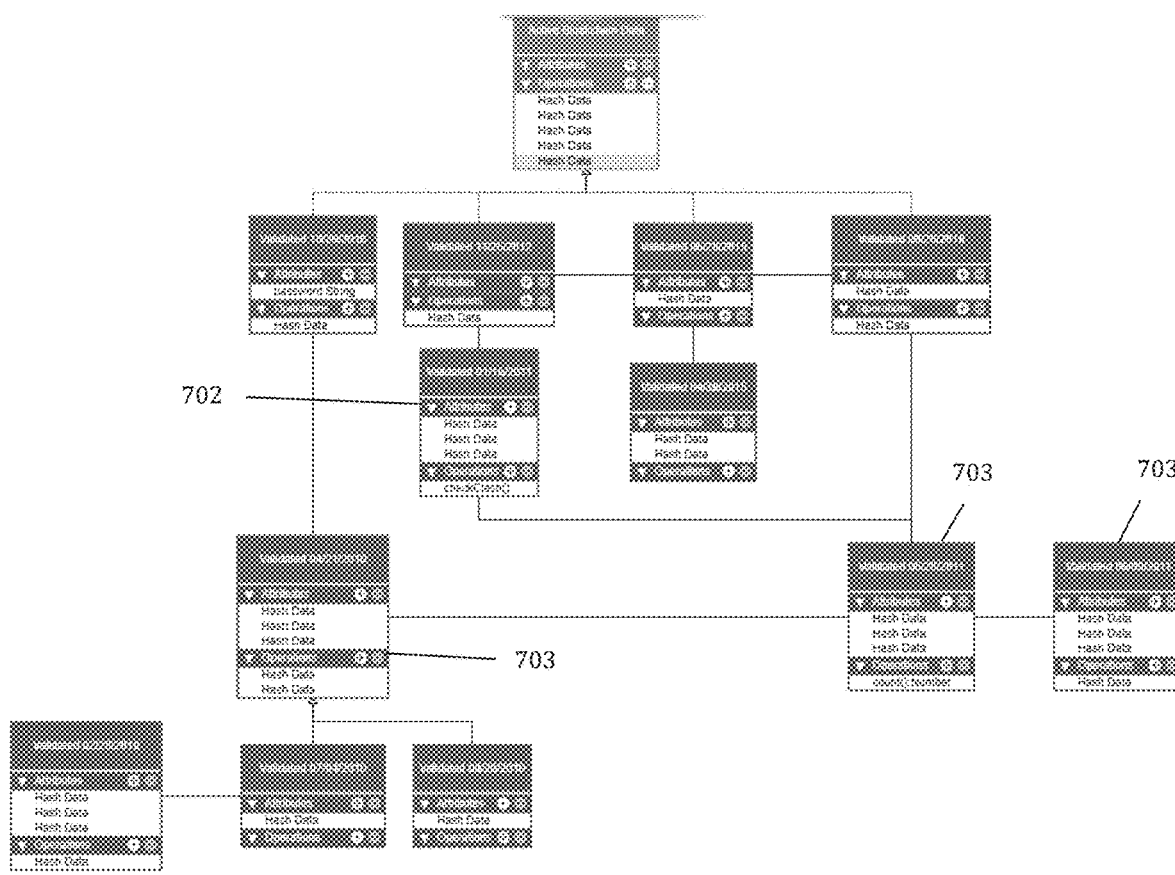
FIG. 7B illustrates an example format of the blockchain during pruning.
Figure 7C:
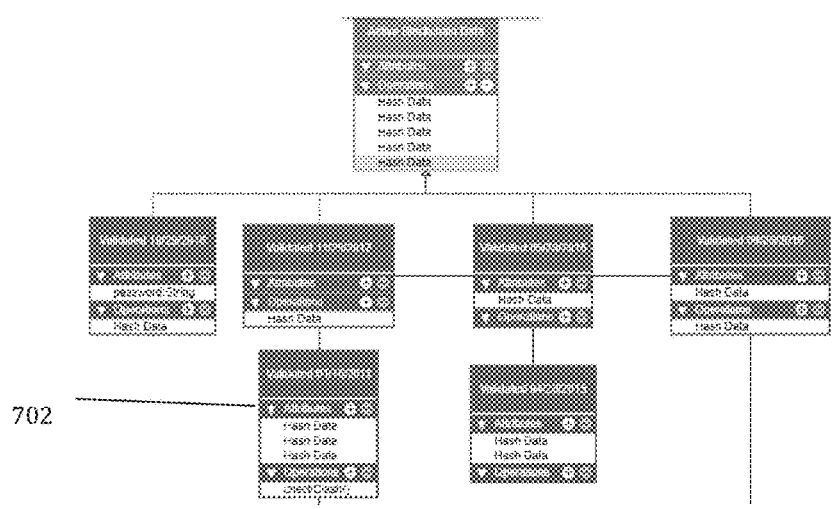
FIG. 7C illustrates an example format of the blockchain after pruning.

Referring to FIGS. 7A, 7B, and 7C, an example format of the blockchain before pruning, during pruning, and after pruning is illustrated. As illustrated in FIG. 7A, before pruning, the active block 701 contains hash data from previous blocks. During pruning, illustrated in FIG. 7B, the blockchain will initially be checked to see if all the data has been validated. If the older blocks 703 have been validated and synced, then the pruning process may begin. Generally, the blockchain will have a trigger event to determine when to begin pruning, and once the requirements of the trigger event are met, the nodes will begin validating and syncing the older blocks 703. This trigger event could be based on size of the blockchain, a certain time frame, or some other event which displays the need to truncate the blockchain. Once the older blocks have been validated and synced, the older validated blocks are pruned and a new starting point is created based on the oldest of the recent nodes 702. FIG. 7C illustrates the new blockchain after pruning. After pruning, the blockchain is reduced in size, and the starting point of the blockchain is now the oldest of the recent blocks 702. This allows the blockchain to not become so large as to detrimentally affect performance.

The detailed description is not intended to be limiting or represent an exhaustive enumeration of the principles disclosed herein. It will be apparent to those of skill in the art that numerous changes may be made in such details without departing from the spirit of the principles disclosed herein.

What is claimed is:

1. A system of invoking informational security, such as to detect a man-in-the-middle attack, the system comprising:
   a communications device consisting of a gateway or network switch;
   a plurality of nodes, wherein each node comprises:
      a ledger of information;
      a communication channel with at least one other node;
      a communication channel with the communications device;
      a storage unit configured to store the ledger of information and compare the information stored in the ledger against information from at least one other node's ledger;
   a baseline of trust configured to be established with common pieces of information within the ledger of information to create a common fingerprint;
   wherein each node is configured to hash information about the communications device and, at predetermined time periods, compare the hash values to the baseline of trust to determine authenticity of the information about the communications device and
   wherein each node is configured to perform security measures if the node determines that the information about the communications device is not authentic.

2. The system of claim 1, wherein the communications device is a router.

3. The system of claim 1, wherein the plurality of nodes are electronic devices.

4. The system of claim 1, wherein each of the communication channels is encrypted.

5. The system of claim 1, wherein the storage unit is stored across each node.

6. The system of claim 1, wherein the ledger of information is created from the network information about the communications device.

7. The system of claim 1, wherein the baseline of trust is dynamic and updates by detecting changes to the ledgers of information that are common to all individual nodes in the system.

8. The system of claim 1, wherein the security measures comprise predetermined security procedures that are configured to be activated when the information in a node's ledger of information does not match the baseline of trust.

9. The system of claim 1, wherein the ledgers of information function as a blockchain.

10. The system of claim 1, wherein the ledger is configured to be pruned if all of the plurality of nodes agree on the authenticity of older pieces of information in the ledger.

11. A method of invoking informational security, such as to detect a man-in-the-middle attack, comprising:
   connecting a plurality of nodes to a network;
   allowing communication channels to be open between each individual node in the plurality of nodes;
   connecting the network to a communications device consisting of a gateway or network switch;
   sharing information about the communications device among the plurality of nodes in the network;
   using the shared information to create a baseline of trust about the communications device;
   within each individual node, hashing the communications device information and, at predetermined time periods, comparing the hash values to the baseline of trust to determine authenticity of the communications device information; and
   performing security measures if any individual node's shared information does not match the baseline of trust.

12. The method of claim 11, further comprising notifying the individual node that contains information dissimilar to the baseline of trust of the information mismatch.

13. The method of claim 12, further comprising quarantining the dissimilar node to keep the rest of the network secure.

14. The method of claim 12, further comprising storing the attacker's forensic information.

15. The method of claim 11, wherein the baseline of trust is dynamic, wherein the dynamic baseline of trust updates by detecting changes to the ledgers of information that are common to all individual nodes in the system.

16. The method of claim 11, wherein each of the communication channels is encrypted.

17. The method of claim 11, wherein the shared information functions as a blockchain.

18. A non-transitory electronically readable medium configured to store instructions that, when executed by a processor in a node, are configured to implement a method for invoking informational security, such as to detect a man-in-the-middle attack, the method comprising:
   connecting the node to a gateway or network switch;
   maintaining at least one communication channel to at least one other unique node in a plurality of nodes in a network;
   storing a first set of information about the gateway or network switch;
   hashing the first set of information;
   sending the hashed first set of information to the at least one other unique node;
   periodically receiving a blockchain containing hashed information about the gateway or network switch from the plurality of nodes and validating the hashed first set of information with the blockchain to determine consensus of the information about the gateway or network switch; and
   performing security measures if the hashed first set of information is not validated.

19. The non-transitory electronically readable medium of claim 18, wherein the step of performing security measures comprises:
   identifying an affected node that provided hashed information that exceeds the threshold for uniqueness; and
   notifying the affected node of a potential compromise.

20. The non-transitory electronically readable medium of claim 18, wherein the at least one communication channel is encrypted.

* * * * *